3,517,903
HANGER ASSEMBLY
Charles Edward Gutshall, Roselle, Ill., assignor to Illinois Tool Works Inc., Chicago, Ill., a corporation of Delaware
Filed May 31, 1968, Ser. No. 733,450
Int. Cl. H02g 3/02
U.S. Cl. 248—291                                                               9 Claims

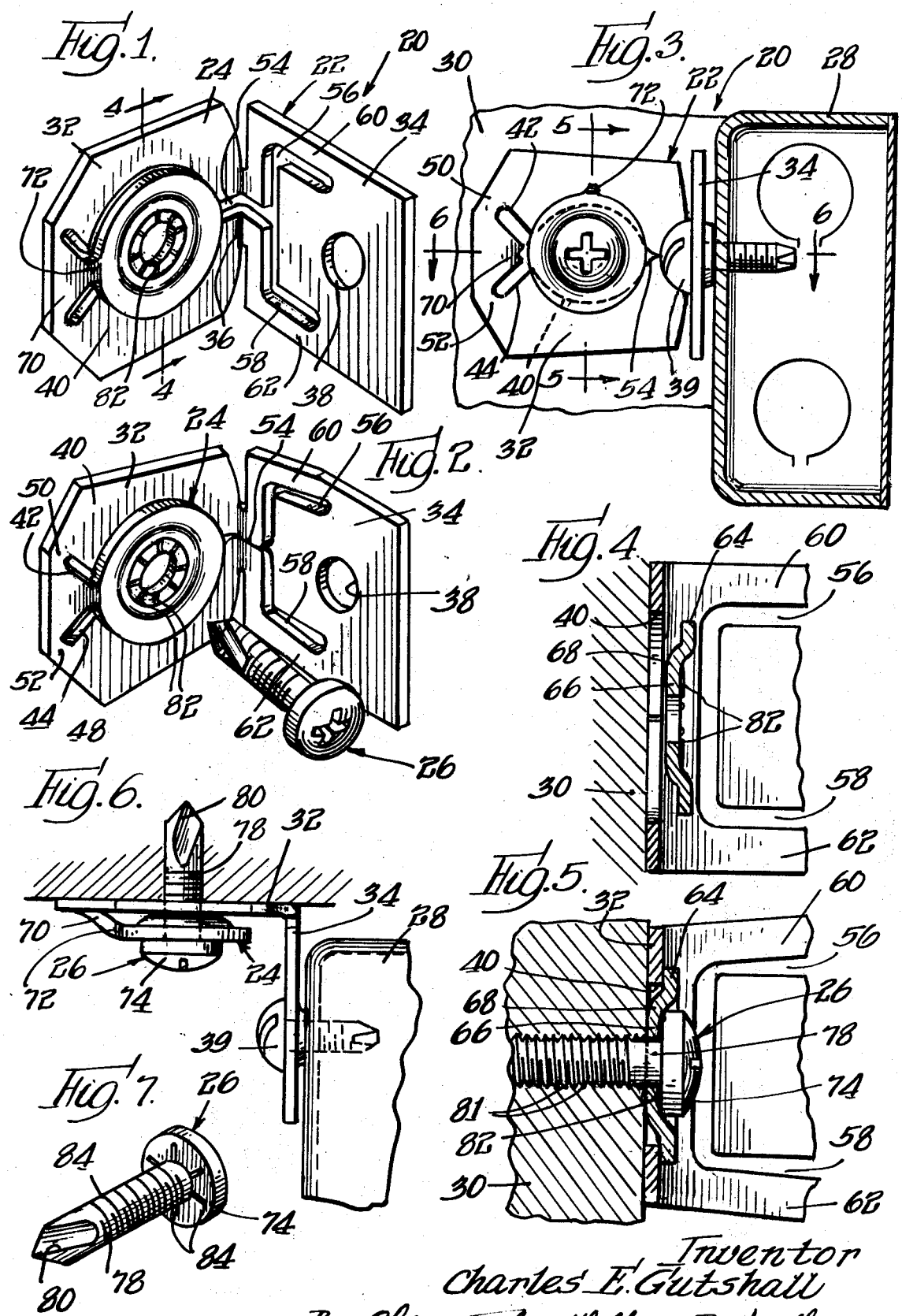

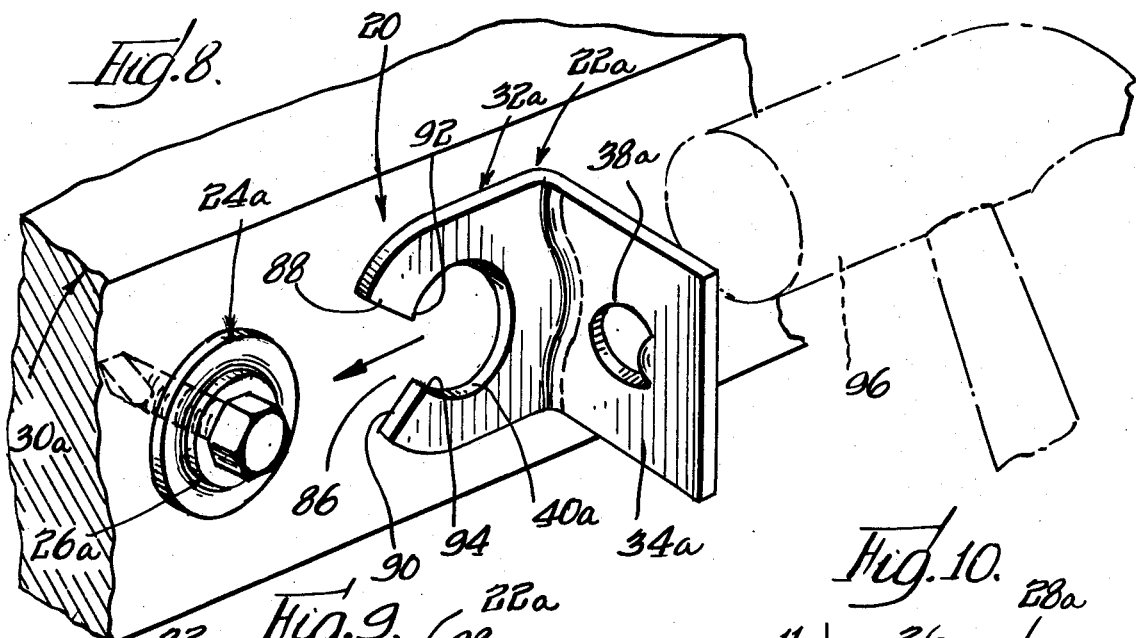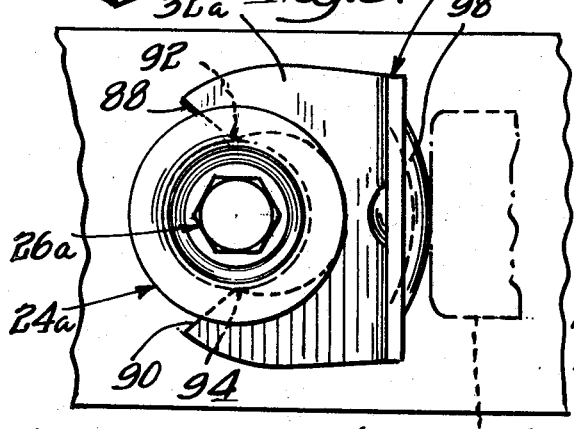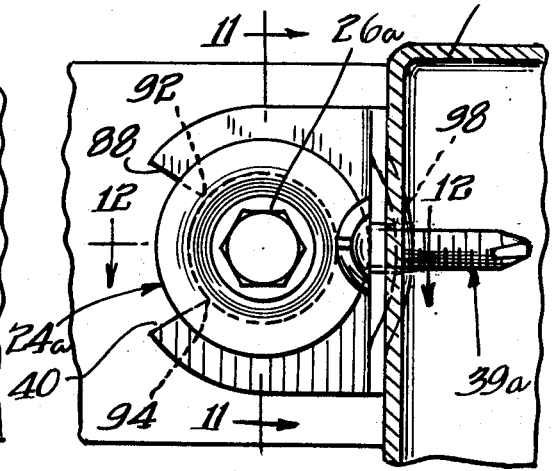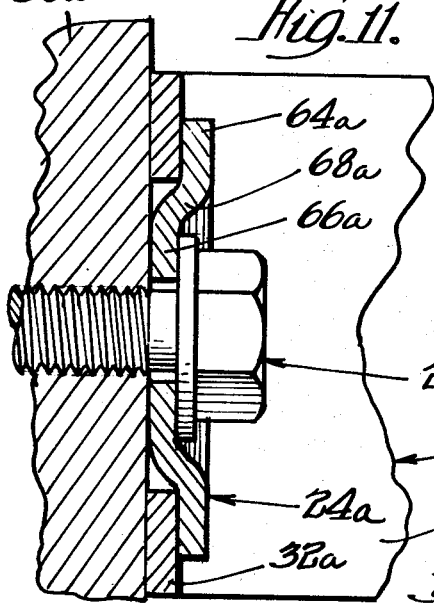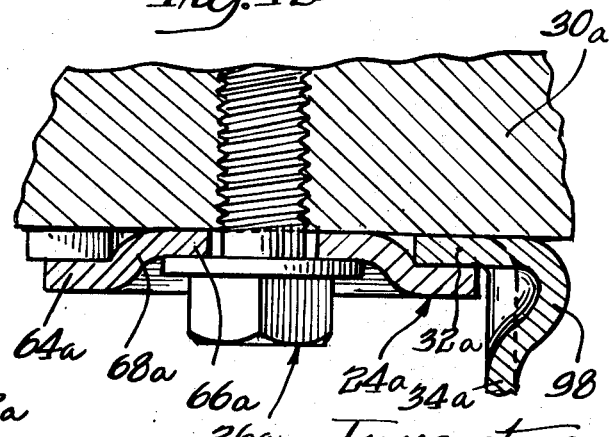
Inventor
Charles E. Gutshall
By: Olson, Trexler, Wolters & Bushnell attys United States Patent Office 3,517,903
Patented June 30, 1970

ABSTRACT OF THE DISCLOSURE

There is disclosed a hanger assembly for items such as electrical outlet boxes, conduit and the like, which assembly comprises a sheet material bracket having a base portion with an aperture therethrough, a dished washer overlying the base portion and extending into the aperture, and a screw or fastener extending through the washer. The washer rotatably retains the base portion.

---

The present invention relates to a novel hanger assembly, and more specifically to an assembly adapted for hanging or mounting a variety of workpieces such as electrical outlet boxes, conduit and the like.

It is an important object of the present invention to provide a novel hanger assembly which is adapted to be quickly and easily secured to a support member such as a wall stud, ceiling joist or the like.

A more specific object of the present invention is to provide a novel hanger assembly having a bracket member, which assembly is adapted to be easily secured to a support member in a manner permitting adjustment of the bracket member for enabling proper positioning of a workpiece such as an electrical outlet box, conduit or the like connected with the bracket member.

A still further specific object of the present invention is to provide a novel hanger assembly of the above described type having a bracket with an aperture or socket portion therein, a washer overlying and cooperating with the socket portion for retaining the bracket while permitting rotation of the bracket for adjustment purposes, and a fastener such as a screw securely retaining the washer and permitting such rotation of the bracket.

A further specific object of the present invention is to provide a novel hanger assembly as set forth in the preceding paragraph wherein the bracket and washer are constructed so that they may initially be formed in one piece and subsequently separated during mounting of the assembly with respect to its support member.

Still another object of the present invention is to provide a novel hanger assembly of the above described type wherein the bracket, washer and fastener or screw are constructed for providing a preassembled unit for facilitating handling and mounting.

Other objects and advantages of the present invention will become apparent from the following description and the accompanying drawings wherein:

FIG. 1 is a perspective view showing a portion of a hanger assembly incorporating features of the present invention and more specifically showing a bracket and washer in an intermediate stage of manufacture;

FIG. 2 is a perspective view showing the bracket and washer in a final stage of manufacture and before assembly with the support and further showing a fastener such as a screw in position to be inserted into the washer;

FIG. 3 is a fragmentary view partially in section showing a hanger assembly incorporating features of the present invention fully mounted to a support member and in turn supporting a workpiece such as an electrical outlet box;

FIG. 4 is an enlarged fragmentary sectional view taken generally along the line 4—4 in FIG. 1;

FIG. 5 is a fragmentary partial sectional view taken generally along the line 5—5 in FIG. 3;

FIG. 6 is a partial sectional view showing the hanger assembly partially secured with respect to the support member;

FIG. 7 is a perspective view showing the screw or fastener included in the hanger assembly;

FIG. 8 is a fragmentary perspective view showing a modified form of the present invention;

FIG. 9 is a side elevational view showing the bracket member of FIG. 8 partially assembled with the washer and screw;

FIG. 10 is a view similar to FIG. 9 but shows the bracket fully assembled with the washer;

FIG. 11 is an enlarged fragmentary sectional view taken along line 11—11 in FIG. 10; and FIG. 12 is an enlarged fragmentary sectional view taken along line 12—12 in FIG. 10.

Referring now more specifically to the drawings wherein like parts are designated by the same numerals throughout the various figures, a hanger assembly 20 incorporating features of the present invention is shown in whole or in part in FIGS. 1 through 7. This assembly includes a bracket 22, a washer 24, and a rotary fastener or screw 26 all of which will be described in detail below. It will be appreciated that the assembly may be used for supporting or hanging a wide variety of workpieces.

In the embodiment shown and for the purpose of illustrating one embodiment of the present invention, the hanger assembly is used for mounting a workpiece such as an electrical outlet box 28 on a wall stud 30. In such an installation, it is frequently desirable that the workman be able to pivot or adjust the wall outlet box so that it may be properly aligned with some other parts of the electrical installation such as a length of conduit. The hanger assembly is constructed in the manner hereinafter described so that such adjustment of the outlet box 28 can be accomplished.

The bracket 22 is preferably formed from sheet metal and has a base portion 32 adapted to abut the support members 30. A laterally extending arm 34 is integrally joined to the base portion along the line 36. The arm is adapted for connection to the outlet box 28 or any other desired workpiece to be mounted. In the embodiment shown, an aperture 38 is provided through the arm for receiving a fastener or screw 39 for securing the outlet box to the arm.

In accordance with a feature of this embodiment of the invention, the washer 24 is initially formed integrally with the bracket 22 by stamping the washer from a mid section of the base portion 32. As shown in FIGS. 1 and 4, the initial forming of the washer leaves the base portion with an aperture 40 having a diameter slightly greater than the maximum diameter of the washer. The base portion is subsequently collapsed so as to reduce the diameter of the aperture 40 to a value less than the diameter of the washer whereby the washer is adapted to overlie internal margins of the base portion for securing the bracket as shown in FIGS. 3 and 5.

In order to facilitate collapsing of the bracket base portion and the reduction in the size of the aperture 40, diverging slots 42 and 44 are formed in an outer end of the base portion so that they extend toward opposite beveled corners 46 and 48. Thus, when lateral pressure is applied to opposite sides of the base portion such as by hammering, the material of the base portion is adapted to bend primarily at areas 50 and 52 at the ends of the slots, which areas are of relatively reduced cross-section. In addition, a slot 54 is formed in an end of the base portion opposite from the slots 42 and 44 and into the arm portion 34. The slot 54 merges with oppositely extending slots 56 and 58 which approach opposite side edges of the arm portion 34 and then extend along said edges toward the outer end of the arm portion for providing the arm portion with relatively narrow and easily collapsible opposite side sections 60 and 62. As shown best in FIG. 2, these side sections as well as the reduced areas 50 and 52 are adapted to be relatively easily collapsed for permitting collapsing of the aperture 40 as previously mentioned.

The washer 24 has generally planar outer and inner marginal annular portions 64 and 66 respectively connected by a dished or inwardly inclined intermediate section 68. As shown best in FIG. 5, the outer annular section 64 is adapted to overlie the base portion of the bracket and the inner annular section 66 is adapted to abut the support member 30 when the hanger assembly is secured against the support member. The construction of the washer is such that the axial spacing between the under or clamping surface of the annular section 64 and the under or clamping surface of the annular section 66 is similar to but slightly less than the thickness of the base portion 32. Thus, when the hanger assembly is mounted against the support member, the washer will clamp the base portion 32 and the bracket against the support member sufficiently for effectively retaining the bracket in the desired position while at the same time permitting the bracket to be manually rotated around the axis of the washer.

As previously indicated, the washer is initially formed integrally with the bracket 22. More specifically, the bracket base portion has a tongue 70 defined by the slots 42 and 44 and deflected out of the plane of the base portion. The tongue is integrally connected to the periphery of the washer along a narrow relatively easily breakable junction 72. This connection between the tongue and the washer is adapted to be broken when the assembly is applied to the support member.

The screw 26 has a head 74 adapted to be engaged by a suitable driving tool and presenting a clamping face 76 having a shape complementary to the dished configuration of the washer. A threaded shank 78 extends axially from the head portion 74. In the embodiment shown, the shank has a cutting or drilling edge 80 formed at the entering end thereof. In addition, thread convolutions 81 are rolled on the screw shank after the shank is assembled with the washer, which convolutions have a diameter greater than the internal diameter of the washer for retaining the screw in preassembled relationship with the washer. Since, as previously indicated, the washer is also initially integrally connected with the bracket, the entire structure comprising the bracket, the washer and the screw, may be provided to the workman in a preassembled condition for facilitating handling and application to the support member.

As indicated best in FIGS. 1 and 7, the washer is formed with radially extending ribs 82 and the clamping face of the screw head is formed with complementary radially extending ribs 84. The construction is such that when the screw is threaded into the support member 30 and thus tightened against the washer, the ribs 84 interengage the ribs 82 so that the driving torque applied to the screw is transmitted to the washer. This torque is sufficient to fracture the junction 72 between the washer and the tongue 70 so that when final assembly has been completed, the bracket is permitted to rotate relative to the washer.

FIGS. 8 through 12 show a modified form of the present invention in which elements corresponding to the structure described above are indicated by the same reference numerals with the suffix *a* added. This embodiment differs in that the bracket 22a and the washer 24a are initially formed separately from each other. It is contemplated that the hanger assembly 20a will be secured to the support member 30a by first driving the screw 26a to fasten the washer against the surface of the support member. Then the bracket 22a is assembled beneath the washer.

In order to permit the bracket 22a to be assembled in the manner mentioned above, an outer end of the base portion 32a is cut away to provide a mouth 86 intersecting the aperture 40a and defined by diverging end or cam surfaces 88 and 90 at opposite sides of the base portion. The minimum transverse dimension of the mouth or, in other words, the dimension between inner corners 92 and 94 of the edges 88 and 90, is less than the diameter of the intermediate section 68a of the washer 24a. Thus, when the bracket is forced from the position shown in FIG. 8 through the position shown in FIG. 9 and to the fully assembled position shown in FIG. 10, the cam surfaces 88 and 90 engage opposite sides of the washer intermediate section and cause the opposite sides of the base portion 32a to spread sufficiently to enable the corners 92 and 94 to be snapped around the washer.

Any suitable means may be provided for forcing the bracket beneath the washer. In the embodiment shown, it is contemplated that a hammer 96 be used for driving the base portion of the bracket beneath the washer. The bracket is preferably embossed to provide a relatively rigid raised bump or anvil 98 at the junction between the base portion 32a and the arm portion 34a, which anvil is adapted to be struck with the hammer for more effectively transmitting the driving force to the base portion of the bracket.

The invention is claimed as follows:

1. A hanger assembly mountable on a support member comprising a bracket including a portion positionable against the support member, said bracket portion having a washer accommodating aperture therethrough with a predetermined transverse dimension, a washer having axially offset inner and outer marginal portions joined by a dished intermediate portion extending or projecting into said aperture, said outer marginal portion having a transverse dimension greater than said predetermined dimension and ovrlying said bracket portion at opposite sides of said aperture, said bracket portion including mouth means communicating with and opening outwardlv from said aperture, and a fastener extending through said washer.

2. A hanger assembly, as defined in claim 1, wherein said bracket portion has a predetermined thickness, said inner and outer washer marginal portions having clamping surfaces axially offset a distance similar to but slightly less than said thickness for clamping said bracket beneath said outer marginal portion when the fastener is tightened sufficiently for urging the inner marginal portion into substantially abutting relationship with said support member.

3. A hanger assembly, as defined in claim 1, wherein said mouth means has a minimum transverse dimension less than the maximum transverse dimension of said intermediate portion of the washer, said mouth means being defined by diverging edges for enabling the bracket portion to be snapped around the intermediate portion of said washer.

4. In a hanger assembly, a bracket including a portion positionable against a suport member, said bracket portion having an aperture therethrough with a predetermined transverse dimension, a bracket retaining washer having a transverse dimension greater than said predetermined dimension and overlying said bracket portion at opposite sides of said aperture, and rupturable connecting means integrally joining said bracket portion and said washer.

5. A device, as defined in claim 4, wherein said washer is formed from material struck from a mid section of the bracket portion, said aperture initially having a transverse dimension greater than said transverse dimension of the washer, and slot means in said bracket portion and extending from said aperture for facilitating lateral collapsing of the bracket portion for reducing the transverse dimension of said aperture to said predetermined dimension.

6. A device, as defined in claim 4, which includes abutment elements on said washer engageable with a rotary fastener when such fastener is driven for securing the device to a support member, the driving torque applied to the fastener being transmitted to the washer through said abutment means for rupturing said connecting means and separating the washer from the bracket portion.

7. A hanger assembly mountable on a support member comprising a bracket including a portion positionable against the support member, said bracket portion having an aperture therethrough with a predetermined transverse dimension, a washer having axially offset inner and outer marginal portions joined by a dished intermediate portion extending or projecting into said aperture, said outer marginal portion having a transverse dimension greater than said predetermined dimension and overlying said bracket portion at opposite sides of said aperture, rupturable connecting means integrally joining said washer and said bracket portion, and a fastener extending through said washer.

8. A hanger assembly mountable on a support member comprising a bracket including a portion positionable against the support member, said bracket portion having an aperture therethrough with a predetermined transverse dimension, a washer having axially offset inner and outer marginal portions joined by a dished intermediate portion extending or projecting into said aperture, said outer marginal portion having a transverse dimension greater than said predetermined dimension and overlying said bracket portion at opposite sides of said aperture, rupturable connecting means integrally joining said washer and said bracket portion, and a rotary fastener extending through said washer said rotary fastener and said washer having interengageable abutment means for locking the washer for rotation with the fastener to thereby cause rupturing of said connecting means joining the washer and the bracket portion.

9. A hanger assembly mountable on a support member comprising a bracket including a portion positionable against the support member, said bracket portion having an aperture therethrough with a predetermined transverse dimension, a washer having axially offset inner and outer marginal portions joined by a dished intermediate portion extending or projecting into said aperture, said outer marginal portion having a transverse dimension greater than said predetermined dimension and overlying said bracket portion at opposite sides of said aperture, rupturable connecting means integrally joining said washer and said bracket portion, said washer comprising material struck from an interior section of the bracket portion to provide said aperture, said aperture initially having a transverse dimension greater than said predetermined dimension, said bracket portion being collapsible for reducing the size of said aperture to said predetermined dimension and a fastener extending through said washer.

References Cited
UNITED STATES PATENTS

| | | |
|---|---|---|
| 1,724,394 | 8/1929 | Chamberlain. |
| 1,764,950 | 6/1930 | Griner. |
| 2,025,848 | 12/1935 | Collis _____ 85—51 X |

ROY D. FRAZIER, Primary Examiner

J. F. FOSS, Assistant Examiner

U.S. Cl. X.R.

85—50; 248—205, 225